United States Patent [19]

Russell et al.

[11] Patent Number: 4,932,747
[45] Date of Patent: Jun. 12, 1990

[54] FIBER BUNDLE HOMOGENIZER AND METHOD UTILIZING SAME

[75] Inventors: Stephen D. Russell; George P. Imthurn, both of San Diego, Calif.

[73] Assignee: The United States of America as represented by the Secretary of the Navy, Washington, D.C.

[21] Appl. No.: 404,243

[22] Filed: Sep. 7, 1989

[51] Int. Cl.$^5$ .......................... G02B 6/04; F21V 7/04; C03B 23/20; H01S 3/22
[52] U.S. Cl. ............................... 350/96.24; 350/96.10; 350/320; 362/32; 362/259; 372/57; 65/4.2; 65/4.3; 219/121.6; 219/121.61; 219/121.79
[58] Field of Search ............... 350/96.10, 96.15, 96.24, 350/96.22, 96.25, 96.21, 96.26, 96.27, 96.28, 96.29, 320; 65/4.1, 4.2, 4.3, 36; 362/32, 259; 352/203; 219/121.6, 121.61, 121.79; 372/57, 33, 9, 6

[56] References Cited

U.S. PATENT DOCUMENTS

| | | | |
|---|---|---|---|
| 3,590,248 | 6/1971 | Chatterton, Jr. | 350/96.24 X |
| 3,600,568 | 8/1971 | Weyrauch | 362/32 X |
| 3,825,336 | 7/1974 | Reynolds | 350/96.24 X |
| 3,926,501 | 12/1975 | Hama | 350/96.24 |
| 3,933,455 | 1/1976 | Chown | 65/4 |
| 4,272,156 | 6/1981 | Ishibashi et al. | 350/96.26 |
| 4,360,372 | 11/1982 | Maciejko | 65/4.21 |
| 4,464,705 | 8/1984 | Horowitz | 362/32 |
| 4,530,565 | 7/1985 | Markle | 350/96.10 |
| 4,656,562 | 4/1987 | Sugino | 362/32 |
| 4,698,084 | 10/1987 | Severijns et al. | 65/4.2 X |
| 4,744,615 | 5/1988 | Fan et al. | 350/96.10 |
| 4,787,013 | 11/1988 | Sugino et al. | 362/32 |
| 4,812,010 | 3/1989 | Osaka et al. | 350/96.22 |

OTHER PUBLICATIONS

Houle, "Basic Mechanisms in Laser etching and deposition" Appl. Phys A41, pp. 315-330, 1986.
Armacost et al., "193-nM Excimer Laser-Assisted Etching" Mat. Res. Soc. Symp. Proc. vol. 76, 1987.
Horiike, "Excimer-Laser Etching on Silicon" Appl. Phys. A44 pp. 313-332, 1987.
Carey et al., "Fabrication of ... Laser Doping (GILD)" IEEE Elect. Dev. Lett. vol. EDL-7 No. 7, 7/86.
Ableson et al., "Epitaxial Ge Si/Si(100) Structures ... " Appl. Phys. Lett. vol. 52 No. 3 1/88 pp. 230-232.
Rothchild et al., "Visible-Laser Etching . . . Modification" J Vac. Sci. Tech B5(5), Sep./Oct. 1987 pp. 1400-1403.
Pini et al., "Optical Fiber Transmission of . . . Laser radiation" Appl. Otpics vol. 26, No. 19, 10/87 pp. 4185-4189.

Primary Examiner—Brian Healy
Attorney, Agent, or Firm—Harvey Fendelman; Thomas Glenn Keough

[57] ABSTRACT

An apparatus and method are provided to homogenize the intensity profile of the beam emitted by an excimer laser. The excimer laser beam is collected by a closely packed ultraviolet-grade optical fiber bundle array having its individual fibers intermingled in a random or preconceived format to result in an intermixing of the light from the individual fiber cores to produce a uniform intensity profile. The output ends of the fibers are gathered or fused, and optionally tapered. before being cleaved to provide an output face that is custom shaped for a desired illumination pattern. The flexible nature of the fiber bundle allows for remote materials processing applications.

10 Claims, 3 Drawing Sheets

FIBER BUNDLE HOMOGENIZER AND METHOD UTILIZING SAME

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Excimer lasers recently have been used to perform materials processing in a variety of applications in order to produce novel structures and devices previously difficult or impossible to manufacture. For example, the high powered, high repetition rate and short wavelength excimer lasers have been employed in semiconductor etching as disclosed by F. A. Houle in the article entitled "Basic Mechanisms in Laser Etching and Deposition", *Applied Physics A*, 41 315 (1986), M. D. Armacost et al. in their article entitled "193-nm Excimer Laser Assisted Etching of Polysilicon", *Materials Research Society Symposium Proceedings,* 76 147 (1987) and in the article by Y. Horiike et al. "Excimer-Laser Etching on Silicon", *Applied Physics A,* 44 313 (1987). In addition to semiconductor etching, excimer lasers also have been used in laser doping as reported in the article by P. G. Carry et al. "Fabrication of Submicrometer MOSFET's Using Gas Immersion Laser Doping (GILD)", *IEEE El Dev. Lett., EDL-*7 440 (1986) and to stimulate alloy growth as discussed in the article by J. R. Abelson et al. "Epitaxial $Ge_xSi_{1-x}/Si(100)$ Structures Produced by Pulsed Laser Mixing of Evaporated Ge on Si(100) Substrates", *Applied Physics Letters* 52 230 (1988). Furthermore, certain metalization processes have benefited from the use of excimer lasers as discussed by M. Rothschild et al. in their article "Visible-Laser Etching of Refractory Metals by Surface Modification", *J. Vac. Sci. Technol. B,* 5 1400 (1987) to name a few applications. A common requirement for these processes is to overcome the non-uniform intensity profile of the excimer beam. These non-uniformities tend to produce detrimental effects in the end product such as rough edge profiles, non-uniform doping profiles and non-uniform alloy concentrations.

Typically, an excimer laser beam without homogenization has an intensity profile much like that shown in FIG. 1. A top view of this intensity profile has, generally speaking, a rectangular spatial pattern, see FIG. 2. This rectangular spatial pattern when combined with the non-uniform intensity profile makes such a composite beam pattern incompatible with numerous materials processing applications.

Several schemes are currently in use which bring the intensity profile into a, more or less, more spatially uniform distribution. One scheme utilizes a segmented mirror which chops the light into roughly 35 pieces and overlaps the images. This produces a uniform central region with a high intensity border that requires cropping. Several additional optical elements are required to fill the effective area of the segmented mirror and image the light after passing through a cropping aperture. Unfortunately, this procedure produces very high energy losses due to the large number of optical elements and its sensitivity to variations in the excimer laser beam divergence to deliver, homogenize, reshape and focus the excimer beam. Using the segmented mirror scheme requires six mirrors and an aperture. Assuming the most efficient coating (UV enhanced aluminum) at 248 nm, results in approximately 12% absorption losses at each mirror. Divergence losses have been measured higher than 10% at each mirror due to the angular dependence of the optical coatings. The aperture contributes roughly 10% losses in such a set up so that the overall loss is at least 78% of the original excimer laser beam energy.

An alternate scheme utilizes a light tunnel with a square aperture into which the excimer beam is focused. The multiple reflections from each internal surface of the light tunnel cuts the beam into many segments which overlap at the exit aperture. The number of reflections in the light tunnel is determined by the focal length of the launching optics. In this case there is a trade off between the high optical homogeneity requiring many reflections and intensity losses. However, to obtain satisfactory intensity uniformity, at least four reflections are required within the light tunnel resulting in at least a 12% loss at each reflection off the alluminized interior. Adding these losses to an additional 0.5% loss at each AR coated surface of the launching and imaging optics, the total laser energy loss amounts to at least 42%. Again, additional optical elements are required to launch and extract the light from the homogenizer.

Neither of these homogenization schemes easily accommodates custom shaped spatial patterns. As a consequence, additional efforts and optical devices must be relied upon to give a designer the necessary latitude to perform a particular materials process application.

Thus, there is a continuing need in the state of the art for an apparatus and method to homogenize the intensity profile of an excimer laser which relies upon the collection of the excimer laser beam by an optical fiber bundle array and the intermixing of the light from the individual fiber cores to produce the uniform intensity profile without a multiplicity of lenses and precisely arranged reflection surfaces with coatings.

SUMMARY OF THE INVENTION

The present invention is directed to providing an apparatus and method for homogenizing the intensity profile of an excimer laser. An excimer laser beam is collected by the input ends of a closely arranged optical fiber bundle array having its individual fibers intermingled in a random or predetermined format that is gathered or fused and, optionally, tapered, and cleaved at an output end to overlay the intensity patterns cut from the laser profile by the input ends of the fibers.

An object of the invention is to homogenize the intensity profile of an excimer laser beam.

Another object is to effect an optical homogenization of an excimer laser beam that eliminates complicated optical setups and allows for remote materials processing.

Yet another object of the invention is to provide an optical homogenization having reduced losses as compared to contemporary homogenization attempts.

Another object of the invention is to provide an optical homogenization of an excimer laser in which its input and/or output ends may be formed in a variety of sizes and shapes to optimize the homogeneity and shape of the beam.

Another object of the invention is to provide for homogenizing the intensity profile of an excimer laser by means of a flexible length that can be tailored to provide direct coupling between an excimer laser and a materials processing chamber to eliminate the need for beam steering optics.

Another object is to provide for the homogenization of an excimer laser beam that relies upon a bundle of UV grade fibers that are intermingled in a random or preconceived format.

Another object is to provide for the homogenization of an excimer laser beam that relies upon a bundle of UV grade fibers that optionally is provided with an integral output lens with an appropriate AR coating.

Another object is to provide for the homogenization of an excimer laser beam that eliminates focused or damaging thresholds for the UV grade fibers and the AR coated fiber ends.

Another object of the invention is to provide for the homogenizing of an excimer laser beam in which the homogenizing vehicle has reduced the possibility of potential damaging mechanisms typical with contemporary homogenizers such as ablation and/or oxidation of the aluminum coating.

Yet another object of the invention is to provide an apparatus and method that varies the degree of homogenization due to changing the diameter and number of individual optical fibers to thereby allow for more stringent homogenization requirements such as to compensate for hot spots in a laser profile which could prove catastrophic in certain medical applications of the excimer laser.

Another object is to provide a means of coupling a plurality of lasers to one or more processing surfaces using a variation of this concept.

These and other objects of the invention will become more readily apparent from the ensuing specification when taken in conjunction with the appended claims and the associated drawings.

DESCRIPTION OF THE PREFERRED EMBODIMENT

Figure 1:
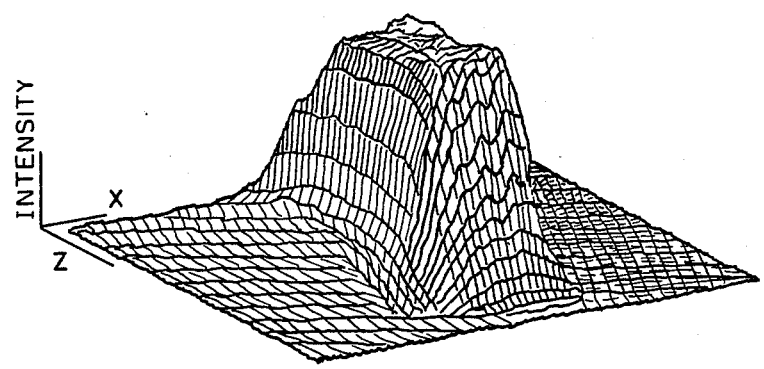
FIG. 1 shows a typical intensity profile of an excimer laser.
Figure 2:
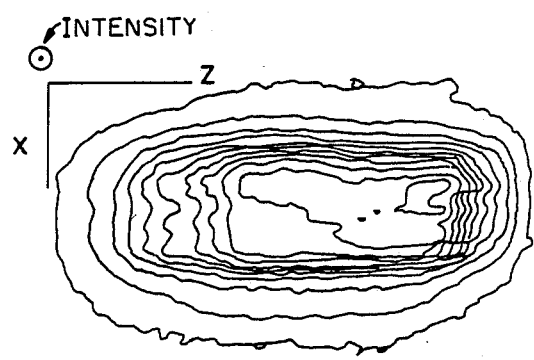
FIG. 2 shows a spatial pattern of intensity of a typical excimer laser.

The typical intensity profile and spatial pattern of the output beam of an excimer laser has been referred to above with respect to FIGS. 1 and 2. It has come to be recognized that such an intensity distribution may adversely affect a number of materials processing applications to such an extent that heretofore elaborate optical schemes had to be relied upon. As mentioned above, these schemes, however, have drawbacks such as a loss of efficiency and a difficulty to implement in the processing operation.

Figure 3:
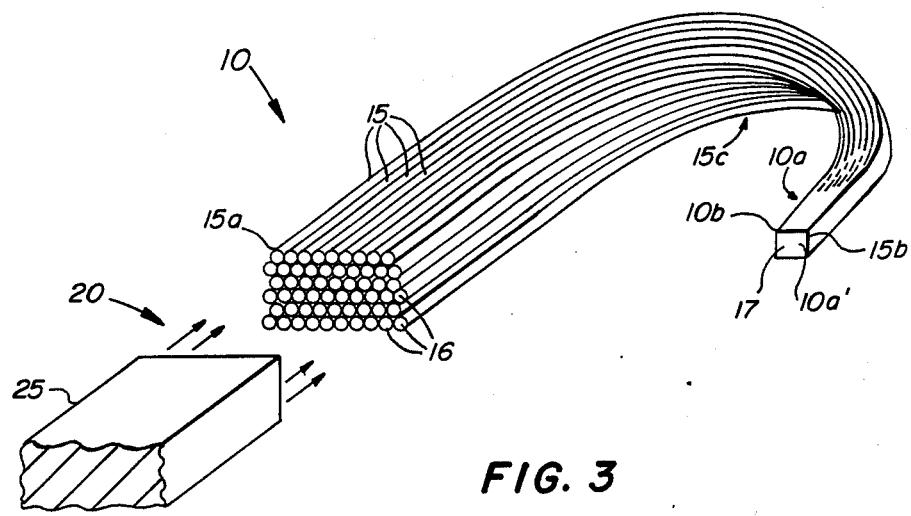
FIG. 3 is an isometric depiction of the fiber bundle homogenizer (FBH) of this invention.

Referring now to FIG. 3, fiber bundle homogenizer (FBH)10 is made up of a number of individual UV grade optical fibers 15 that are arranged in a closely packed distribution in an output beam 20 coming from an excimer laser 25. Side-by-side input ends 15a of the fibers are relatively closely packed to optimize the collection efficiency of the homogenizer although the fibers could be arranged in a variety of distributions depending on the task. An anti-reflective (AR) coating 16 may be deposited at the input faces of input ends 15a of the close packed UV fibers which receive the excimer beam to help reduce transmission losses.

The individual fibers are made of ultraviolet (UV) grade fused silica allowing for transmission of the UV wavelengths typically emitted from excimer lasers for a variety of materials processing applications. Each fiber core radius should be large compared to the cladding thickness for optimal packing efficiency (a cladding diameter to core diameter ratio of 1.2:1 is typical). Such a cladding thickness will prevent transmission losses resulting from scattering into the bundle cladding. The individual fibers may be envisioned to have a square core and/or cladding cross section or other geometrical shape to optimize the packing efficiency.

The use of a bundle of individual fibers allows for the flexibility of the FBH which is a significant feature of this inventive concept. A multitude of individual optical fibers 15 can be included to an extent necessary for any practicable size and shape thereby allowing collection of light beam 20 at input ends 15a from any excimer laser 25. Typically, a 12 millimeter by 25 millimeter rectangle is required for the excimer lasers which are currently available.

Individual optical fibers 15 can extend for a considerable distance although a 1 meter length has been found to be suitable for some materials processing applications. FBH 10 is provided with a gathered or fused region 10a made up of gathered or fused output ends 15b of optical fiber 15. Region 10a may be custom-shaped for a particular application and may be coated with an AR coating 17 to further reduce transmission losses. A lens 10a' may be ground or otherwise appropriately configured into output ends 15b or a lens may be suitably cemented to focus the homogenized beam for the job at hand.

The homogenization of the intensity profile of the UV laser beam of the excimer laser is enhanced to produce a more uniform intensity profile by changing the continuity orientation of individual fibers along a region 15c that extends at least part way along the length of the bundle to its output ends 15b in gathered or fused region 10a. The individual fibers are intermingled in a random or preconceived format along the length of intermingled region 15c to result in an intermixing of the light from the individual fiber cores at a cleaved, fused end 10b of fused region 10a to produce a uniform intensity profile. That is to say, the relative spatial disposition of the fibers is altered as the optical fibers of the bundle make their transition from the input end to cleaved, fused end 10b by rearranging the fibers by randomly, or in a preconceived fashion, placing the fibers in a different relative location at the opposite ends of the bundle of the FBH. The predetermined arrangement of the individual fibers assures that the excimer laser output is intermixed after passing through the UV grade optical fibers which pass the UV wavelengths. This arrangement helps assure that the intensity profile cut from the laser beam profile by input ends 15a of the close packed bundle is an overlaying of the optical intensity patterns emanating from cleaved, fused end 10b of fused region 10a to thereby enhance the creation of the homogenizing of the intensity profile.

In one embodiment of the invention, it may be that the output ends of the fibers are fused and cleaved at the center of fused region 10a which integrally extends in the bundle of optical fibers in accordance with known techniques practiced in the art of optical fiber couplers. The intermingling of the fibers 15 of FBH 10 in region 15c, fusing and cleaving further assures the overlays of the intensity patterns at cleaved, fused end 10b which were cut from the laser profile by the arrangement of input ends 15a. Tapering of fibers 15 of FBH 10 in fused region 10a while the fibers are plastic during fusing is an option that may be used to give a further capability since this technique further allows region 10a of the FBH to be fashioned into the different sizes and shapes required for a subsequent materials processing operation. The tapered, cleaved region may be polished or appropriately shaped to provide a useful optical quality surface. Due to the multimode nature of the excimer laser, deleterious effects on mode structure will not be evidenced by such a homogenization technique.

Figure 4:
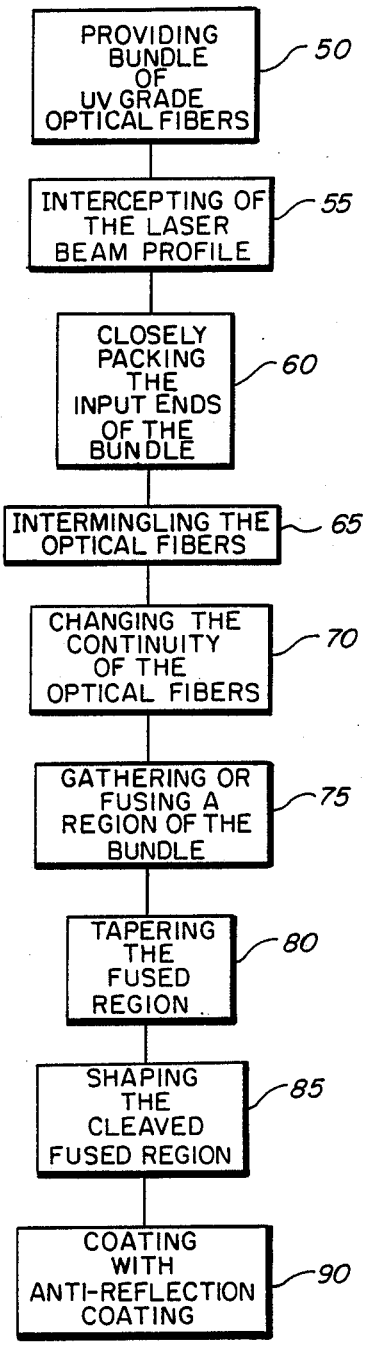
FIG. 4 depicts a block diagram representation of the method of the invention.

Referring now to FIG. 4 a method of homogenizing the intensity profile of a laser beam of an excimer laser is depicted to include the providing 50 of a bundle 15 of UV grade optical fibers. The intercepting 55 of the profile of laser beam 20 of an excimer laser 25 with input ends 15a of the bundle of UV grade optical fibers allows the energy to transit the length of the UV grade optical fibers. Closely packing 60 the bundle of UV grade optical fibers allows the intensity to be increased so that an intermingling 65 or changing 70 of the continuity of the optical fibers in a region 15c can be made to enhance the homogenization of the laser beam. A gathering or fusing 75 of a region 10a of the bundle of UV grade optical fibers together can occur as well as a tapering 80 of the fused region to provide the homogenization in a desired configuration. Optionally, a shaping 85 of a cleaved, fused end 10b of the UV grade optical fibers may occur to provide the homogenizing at a desired configuration. A coating 90 of input ends 15a of the bundle of the UV grade optical fibers and the output ends 15b of the bundle of the UV grade optical fibers in the cleaved, gathered or fused region 10b with an anti-reflection coating helps reduce losses to increase the overall efficiency of the fiber bundle homogenizer.

The optical homogenization provided by the FBH is a considerable simplification with respect to conventional approaches. The FBH by its uncomplicated efficient design minimizes laser power requirements, eliminates complicated optical set ups and allows for remote processing.

A comparison of the intensity losses associated with the different homogenization schemes discussed in the background above will emphasize the advantages of this concept. The two state-of-the-art schemes discussed above have losses in the neighborhood of at least 78% for one and at least 42% for the other.

The factors contributing to energy losses in the FBH are the packing factor (PF), internal absorption and reflections at its surfaces. PF accounts for the finite packing density of the circular cross sections of the optical fibers for collecting the laser light and may be stated by the expression, $$PF = 0.907(r/(r+t))^2$$

where r is the fiber core radius and t the cladding thickness. Typical values of 1,000 microns and 200 microns for the core and cladding respectively result in a loss of 24% due to the finite packing density. Differently geometrically configured fibers will have higher PFs.

The article entitled "Optical Fiber Transmission of High Power Excimer Laser Radiation" by Roberto Pini et al. appearing in *Applied Optics* 26, 19, (1987) shows that individual UV grade optical fibers have been manufactured and have had excimer laser beams successfully launched through them. Attenuation with the fiber can be estimated from the data of this article which provides a transmission coefficient of 0.11 $m^{-1}$ at 248 nm. Therefore, in one meter of fiber (a typical optical path length for an FBH) there will be 89% transmission of the incident light. AR coating of the entrance and exit surfaces of the FBH will result in losses of only 1% due to reflection.

The resulting estimate of optical losses using the FBH is only about 33%. This is superior to the other homogenization schemes and doesn't account for the additional losses suffered in the other cases due to their potential damage mechanisms.

Having the foregoing information at hand, it is apparent to one skilled in the art to which this invention pertains that the input ends of the optical fibers of the FBH collectively may be formed in any size or shape to optimize the light gathering or collection directly from the output of an excimer laser. This capability makes the FBH insensitive to the beam divergence and eliminates the need for beam launching optics. The exit ends of optical fibers of the FBH collectively may be tapered and suitably formed for the size and shape of the required materials processing operation. This capability eliminates the subsequent need for reshaping and focusing the rectangular excimer profile and the associated energy losses that may otherwise be encountered. The flexible length of the optical fibers of the FBH may be tailored to a desired length to provide direct coupling between the laser and the processing chamber. This capability eliminates the need for beam steering optics with their additional losses and allows for remote processing.

The FBH design inherently possesses the capability to eliminate the potential damage mechanisms, typical with previously designed homogenizers (ablation and/or oxidation of the aluminum coating) since the excimer beam is not focused into the FBH. In other words, the damage thresholds for the UV grade fibers (greater than 1 GW/centimeter$^2$) and the AR coated fiber ends (greater than 5 GW/centimeter$^2$) do not exceed the energy density that is common in the output beam of all commercial excimer lasers.

Furthermore, the FBH design provides a degree of homogenization which is variable by merely changing the number of individual optical fibers and/or their cross-sectional shape that are used to create the FBH. This capability allows for more stringent homogenization requirements such as to compensate for potentially damaging hot spots that might be found in the laser profile which could prove catastrophic in medical applications of the excimer laser.

This homogenization scheme has proven itself useful for the UV energy emitted from an excimer laser for a desired materials processing. It could, however, be extended throughout a broader wavelength range by appropriate choice of fiber materials for optimal transmission. For example, radiation produced by lasers in the visible range of the spectrum (for example helium-neon, argon-ion, etc.) could have their typical Gaussian-shaped intensity profile homogenized and reshaped. Operation of excimer lasers at wavelengths below 248 nm, where ozone production becomes significant if the optical path is in the atmosphere may be simplified using an FBH made of magnesium fluoride which has suitable transmission properties in the hard UV. The output from near-infrared laser diodes and diode arrays might also be suitably homogenized to suit a particular application. As the use of excimer laser technology becomes more commonplace, homogenization techniques may be required in many diverse uses and applications which one skilled in the art to which this invention pertains would readily adapt this inventive concept.

Figure 5:
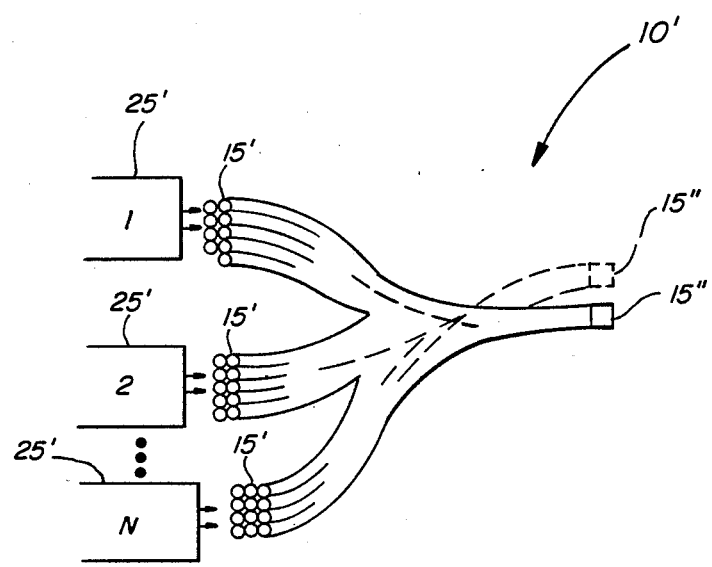
FIG. 5 shows a variation of this concept in which a FBH has more than one laser input and terminates in one or more output ends.

FIG. 5 shows a variation of this inventive concept in which a modified FBH 10'. This FBH is configured to accommodate more than one laser 25' which each emits energy into selective groups of fibers 15' and delivers selective amounts of the emitted energy in predetermined amounts at one or more output surfaces 15'. This arrangement is fabricated in accordance with the aforestated teachings and, since the amount and constituency of energy, its intensity and degree of homogenization may be changed by appropriate usage of a selected bundle configuration, a designer has considerable options. Thus, having this concept in mind, a designer may direct different energy levels to more than one work surface or may combine energy levels as necessary to successfully complete a particular materials processing application.

Obviously, many modifications and variations of the present invention are possible in the light of the above teachings. It is therefore to be understood that within the scope of the appended claims the invention may be practiced otherwise than as specifically described.

We claim:

1. A method of homogenizing the intensity profile of a laser beam of an excimer laser comprising:
   providing a bundle of UV grade optical fibers;
   intercepting the laser beam profile of said excimer laser with input ends of said bundle of said UV grade optical fibers;
   intermingling said bundle of UV grade optical fibers in a region to assure said homogenizing.
   fusing a region of the intermingled region of said bundle of said UV grade optical fibers together;
   cleaving the fused region of said UV grade optical fibers at or near the center of said fused region; and
   overlaying the optical intensity patterns cut from said laser beam profile by said input ends of said bundle of said UV grade optical fibers at the cleaved fused region thereby creating said homogenizing.

2. A method according to claim 1 further including: closely packing said input ends of said bundle of said UV grade optical fibers together prior to said intercepting.

3. A method according to claim 2 further including: shaping the cleaved fused region of said UV grade optical fibers to provide said homogenizing in a desired configuration.

4. A method according to claim 3 further including: tapering said fused region to provide said homogenizing in a desired configuration.

5. A method according to claim 4 further including: coating said input ends of said bundle of said UV grade optical fibers and said cleaved fused region with an anti-reflection coating to reduce losses.

6. A method according to claims 1, 2 or 3 further including:
   coating said input ends of said bundle of said UV grade optical fibers and said cleaved fused region with an anti-reflection coating to reduce losses.

7. A method according to claims 1, 2, 3, 4, or 5 in which the intermingling includes:
   changing the continuity orientation of said optical fibers in said intermingled region of said bundle of said UV grade optical fibers to further assure said homogenization.

8. An apparatus for homogenizing the intensity profile of a laser beam of an excimer laser comprising:
   a bundle of UV grade optical fibers having their input ends disposed to intercept at least portions of said intensity profile of said laser beam;
   an intermingled region of said bundle of said UV grade optical fibers integrally extending therewith to change the continuity orientation of said optical fibers in said bundle of said UV grade optical fibers to help assure said homogenization of said at least portions of said intensity profile;
   a fused region of said bundle of said UV grade optical fibers integrally extending with said intermingled region; and
   a cleaved end of said fused region of said bundle of said UV grade optical fibers assuring an overlaying of the intensity patterns of said at least portions of said intensity profile intercepted by said input ends to assure said homogenizing.

9. An apparatus according to claim 8 in which said bundle of said UV grade optical fibers is arranged to collect at least portions of the intensity profile of laser beams emitted from more than one excimer laser and is further arranged to provide at least one output homogenized beam for a processing application.

10. An apparatus according to claim 9 in which said bundle of said UV grade optical fibers is arranged to provide more than one output homogenized beam for more than one processing application.

* * * * *